(12) United States Patent
Ly et al.

(10) Patent No.: US 12,445,180 B2
(45) Date of Patent: Oct. 14, 2025

(54) CHANNEL STATE INFORMATION PROCESSING PARAMETERS FOR MULTIPLE CONFIGURED CODEBOOKS

(71) Applicant: QUALCOMM Incorporated, San Diego, CA (US)

(72) Inventors: Hung Dinh Ly, San Diego, CA (US); Yu Zhang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/663,404

(22) Filed: May 13, 2022

(65) Prior Publication Data

US 2023/0370137 A1 Nov. 16, 2023

(51) Int. Cl.
*H04B 7/06* (2006.01)
*H04L 5/00* (2006.01)

(52) U.S. Cl.
CPC ......... *H04B 7/0626* (2013.01); *H04B 7/0639* (2013.01); *H04L 5/0051* (2013.01)

(58) Field of Classification Search
CPC .. H04B 7/0626; H04B 7/0639; H04B 7/0452; H04B 7/0456; H04B 7/0617; H04B 17/345; H04B 17/24; H04L 5/0051; H04L 5/0053; H04L 5/0048; H04L 5/0057
See application file for complete search history.

(56) References Cited

U.S. PATENT DOCUMENTS

| | | | |
|---|---|---|---|
| 2015/0162966 A1* | 6/2015 | Kim | H04L 5/0057 370/252 |
| 2017/0303267 A1* | 10/2017 | Shin | H04W 72/21 |

\* cited by examiner

*Primary Examiner* — Dady Chery
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a configuration of a channel state information (CSI) report including multiple codebooks, wherein each codebook, of the multiple codebooks, is associated with a corresponding antenna port configuration. The UE may compute at least one CSI processing parameter based at least in part on the configuration of the CSI report. Numerous other aspects are described.

30 Claims, 9 Drawing Sheets

CHANNEL STATE INFORMATION PROCESSING PARAMETERS FOR MULTIPLE CONFIGURED CODEBOOKS

FIELD OF THE DISCLOSURE

Aspects of the present disclosure generally relate to wireless communication and to techniques and apparatuses for channel state information processing parameters for multiple configured codebooks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a configuration of a channel state information (CSI) report including multiple codebooks, wherein each codebook, of the multiple codebooks, is associated with a corresponding antenna port configuration. The method may include computing at least one CSI processing parameter based at least in part on the configuration of the CSI report.

Some aspects described herein relate to an apparatus for wireless communication at a UE. The apparatus may include a memory and one or more processors coupled to the memory. The one or more processors may be configured to receive, from a network entity, a configuration of a CSI report including multiple codebooks, wherein each codebook, of the multiple codebooks, is associated with a corresponding antenna port configuration. The one or more processors may be configured to compute at least one CSI processing parameter based at least in part on the configuration of the CSI report.

Some aspects described herein relate to a non-transitory computer-readable medium that stores one or more instructions for wireless communication. The one or more instructions, when executed by one or more processors of a UE, may cause the UE to receive, from a network entity, a configuration of a CSI report including multiple codebooks, wherein each codebook, of the multiple codebooks, is associated with a corresponding antenna port configuration. The one or more instructions, when executed by one or more processors of a UE, may further cause the UE to compute at least one CSI processing parameter based at least in part on the configuration of the CSI report.

Some aspects described herein relate to an apparatus for wireless communication. The apparatus may include means for receiving, from a network entity, a configuration of a CSI report including multiple codebooks, wherein each codebook, of the multiple codebooks, is associated with a corresponding antenna port configuration. The apparatus may include means for computing at least one CSI processing parameter based at least in part on the configuration of the CSI report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
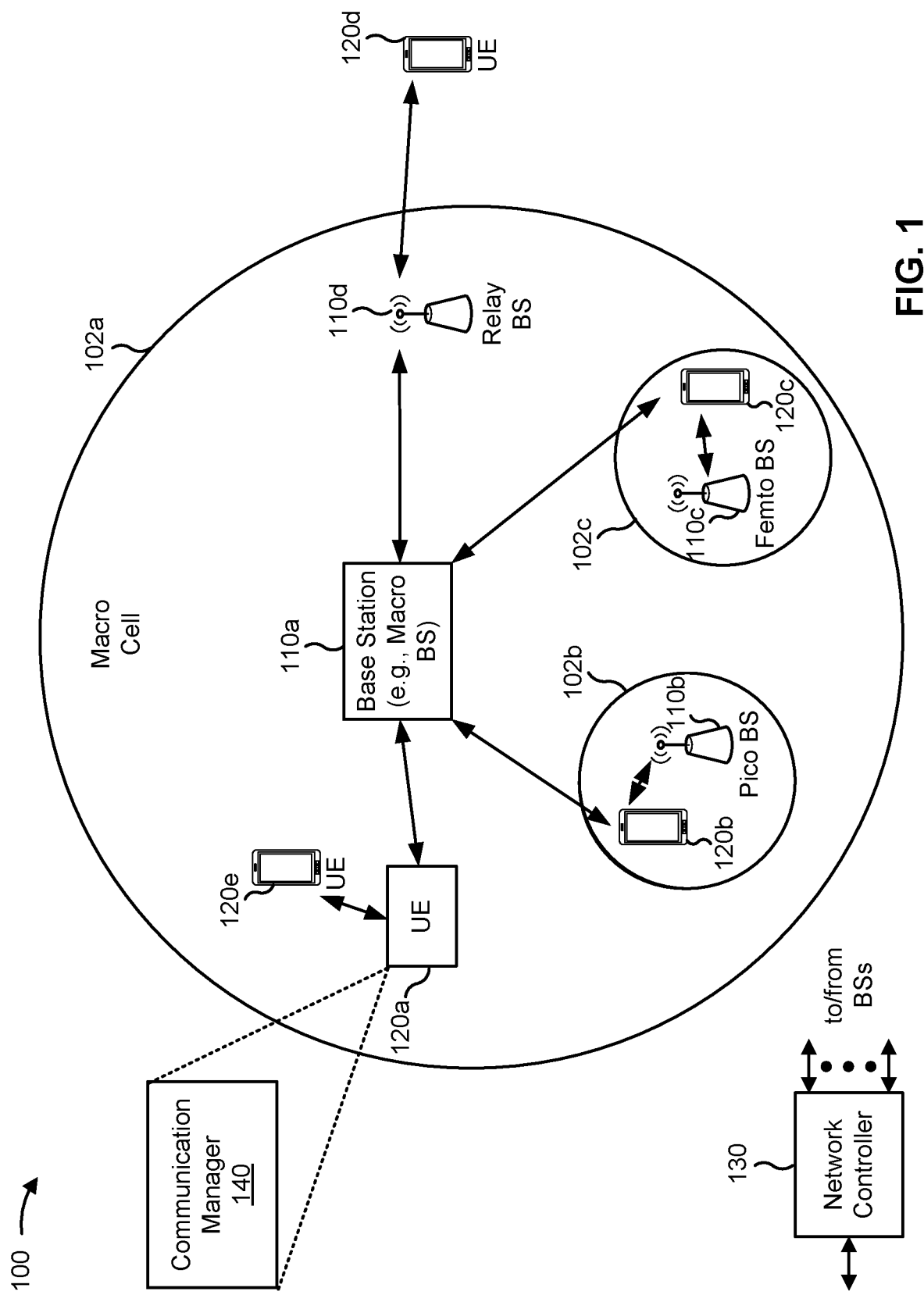
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (O-RAN) architecture, or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a configuration of a channel state information (CSI) report including multiple codebooks, wherein each codebook, of the multiple codebooks, is associated with a corresponding antenna port configuration; and compute at least one CSI processing parameter based at least in part on the configuration of the CSI report. Additionally, or alternatively, the communication manager 140 may perform one or more other operations described herein.

As indicated above, FIG. 1 is provided as an example. Other examples may differ from what is described with regard to FIG. 1.

Figure 2:
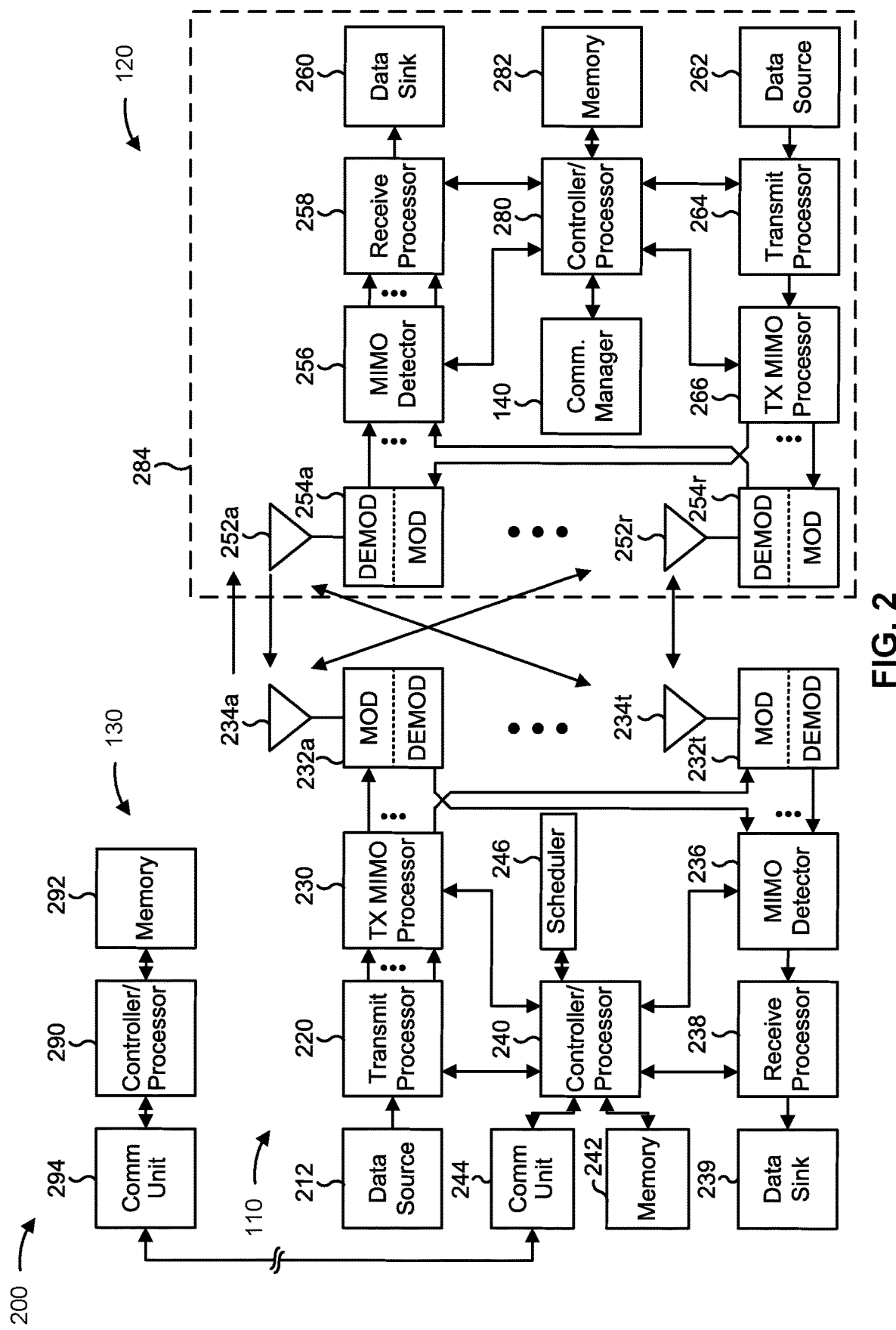
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-9).

The controller/processor 240 of the base station 110, the controller/processor 280 of the UE 120, and/or any other component(s) of FIG. 2 may perform one or more techniques associated with CSI processing parameters for multiple configured codebooks, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a configuration of a CSI report including multiple codebooks, wherein each codebook, of the multiple codebooks, is associated with a corresponding antenna port configuration; and/or means for computing at least one CSI processing parameter based at least in part on the configuration of the CSI report. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
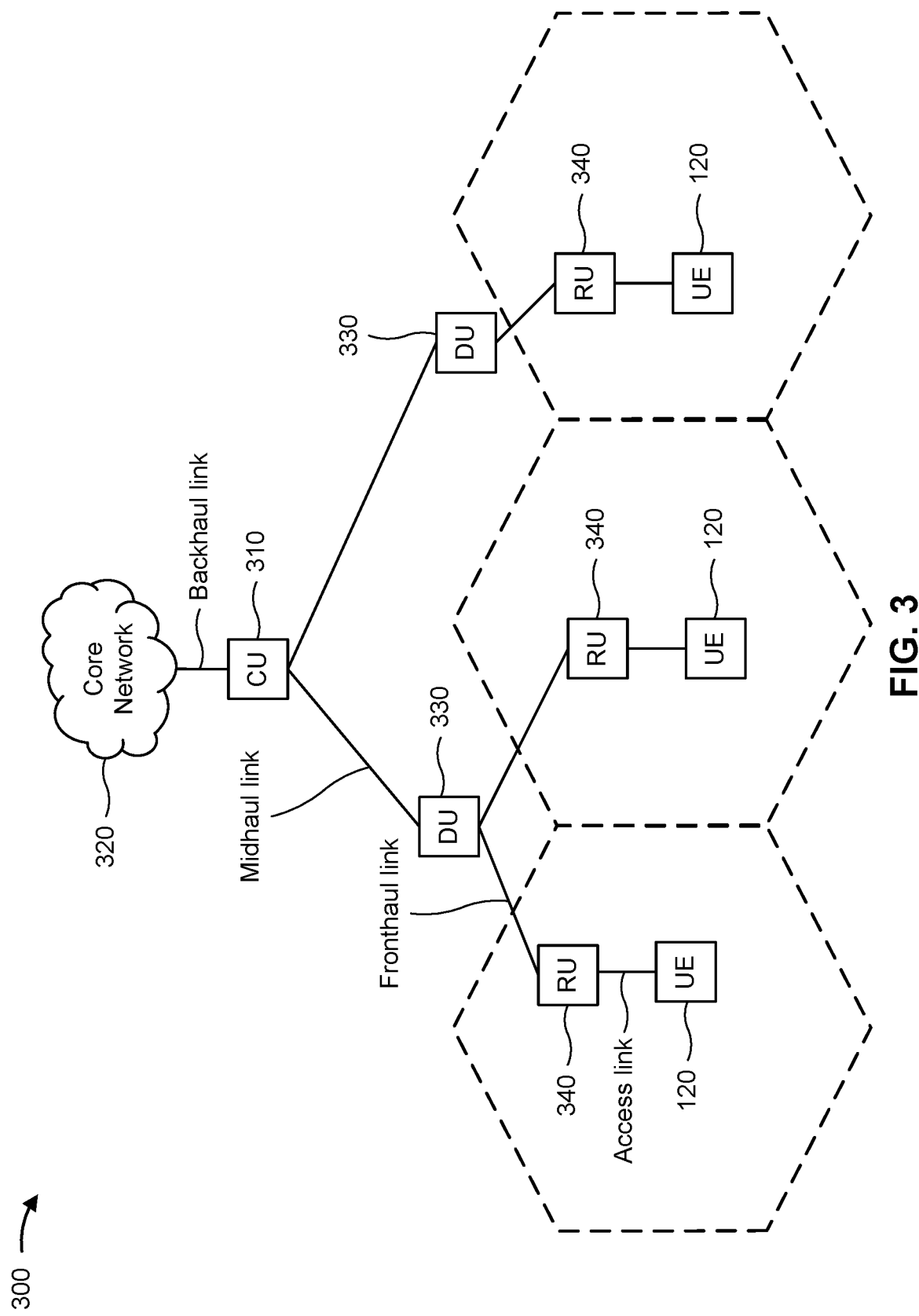
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
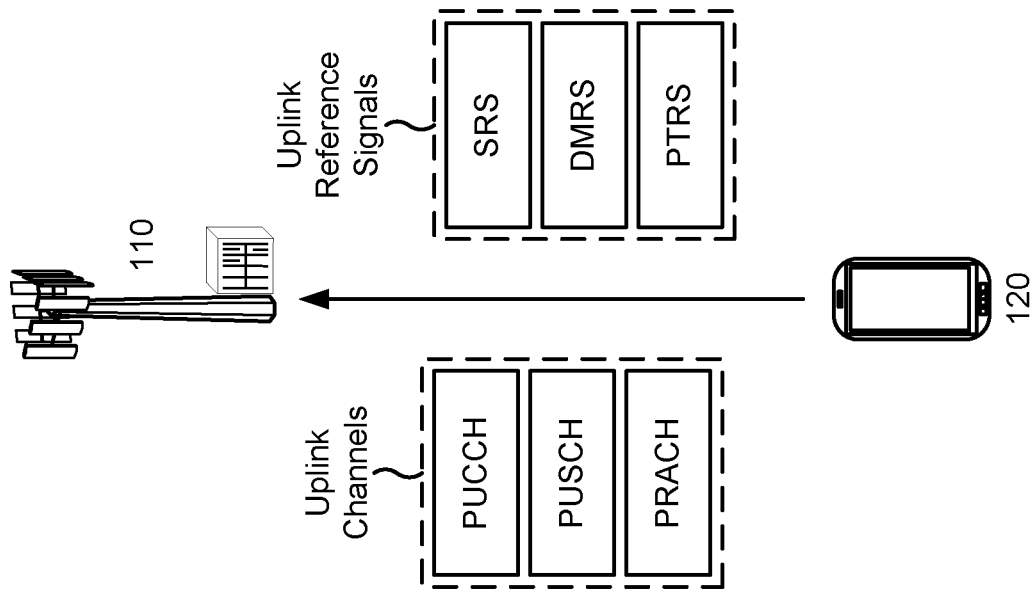
FIG. 4 is a diagram illustrating an example of physical channels and reference signals in a wireless network, in accordance with the present disclosure.
Figure 4:
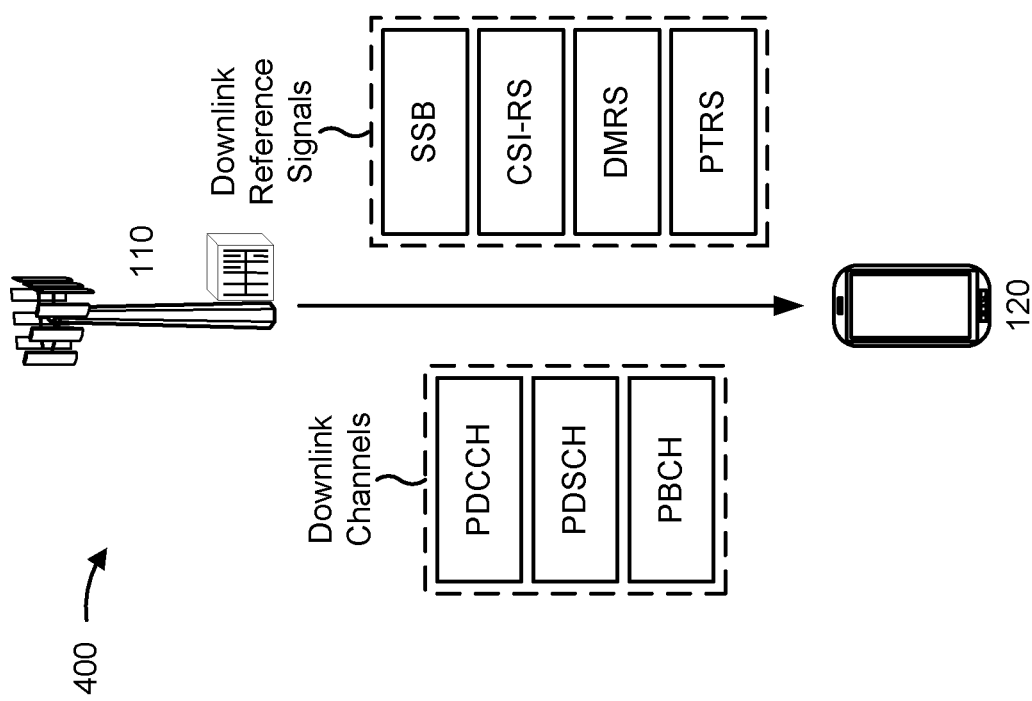

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a CSI reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 or a similar network entity (e.g., a CU 310, a DU 330, an RU 340, or the like) may configure a set of CSI-RSs for the UE 120, and the UE 120 may measure the configured set of CSI-RSs. For example, a network entity may configure a set of CSI-RS resources using a CSI reporting setting (e.g., a CSI report configuration), and the UE 120 may perform a channel measurement, an interference measurement, or the like based on the configured set of CSI-RS resources. In some aspects, the CSI-RS resources may include one or more of a non-zero power (NZP) CSI-RS resource for channel measurement (sometimes referred to as an NZP CMR resource), a CSI-RS resource for interference measurement (sometimes referred to as a CSI-IM resource), or an NZP CSI-RS resource for interference measurement (sometimes referred to as an NZP IMR resource). The CSI reporting setting may configure additional parameters, such as a codebook configuration, which may configure a codebook type (e.g., type I-single panel, type I-multi panel, or type II), an antenna configuration (e.g., (N1, N2), wherein N1 and N2 refer to a number of cross-polarized antenna elements within an antenna panel), a rank indicator (RI) restriction, or the like. The CSI reporting setting may also configure a type of CSI report to be used, such as one of a periodic CSI report, a semi-persistent CSI report, or an aperiodic CSI report. The CSI reporting setting may be RRC configured per bandwidth part (BWP), and may configure one or more resource sets, each resource set including $K_S$ CSI-RS resources with the same number of CSI-RS ports. When $K_S$ is equal to 1, each CSI-RS resource may contain up to 32 CSI-RS ports. When $K_S$ is equal to 2, each CSI-RS resource may contain up to 16 CSI-RS ports. And when $K_S$ is greater than 2 and less than or equal to 8, each CSI-RS resource may contain up to 8 CSI-RS ports.

Based at least in part on the measurements of the CSI-RSs, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), an RI, or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples. In some aspects, the UE 120 may compute certain processing parameters (sometimes referred to as CSI processing parameters) related to the CSI measurements and reporting procedures described above. Aspects of the CSI processing parameters are described in more detail in connection with FIGS. 5 and 6.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
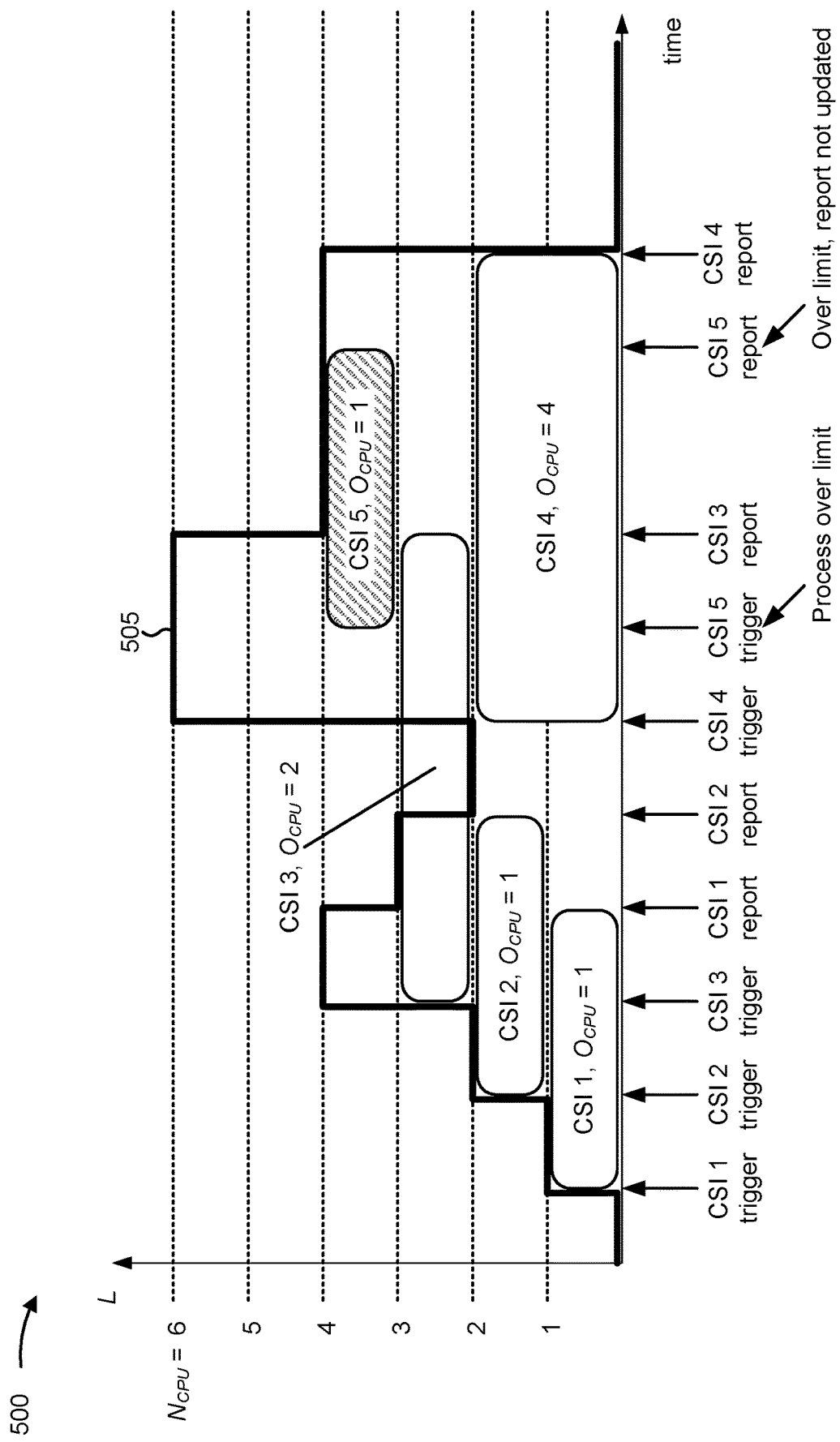
FIG. 5 is a diagram illustrating an example of computing CSI processing parameters, in accordance with the present disclosure.

FIG. 5 is a diagram illustrating an example 500 of computing CSI processing parameters, in accordance with the present disclosure.

In some aspects, the UE 120 may compute one or more CSI processing parameters in connection with the CSI measuring and reporting procedures described above in connection with FIG. 4 or similar CSI reporting procedures. For example, the UE 120 may receive a configuration of a CSI report (e.g., a CSI reporting setting), and may compute one or more CSI processing parameters in connection with performing measurements or the like associated with the corresponding report. For example, the UE 120 may count a number of simultaneously occupied CSI processing units (CPUs) associated with a CSI report, a number of simultaneously active CSI resources associated with a CSI report, and/or a computation time associated with a CSI report.

More particularly, FIG. 5 illustrates aspects associated with counting a number of simultaneously occupied CPUs associated with a CSI report. In some aspects, the UE 120 may report to a network entity (such as a base station 110, a CU 310, a DU 330, an RU 340, or the like) the UE 120's capability on the number of simultaneous CPUs the UE 120 can handle, sometimes referred to as $N_{CPU}$. When processing CSI related information, the UE 120 may keep a running count of occupied CPUs (sometimes referred to as L), which are associated with the processing units that are in use by ongoing CSI reports. Any time a CSI calculation begins, the count, L, may be incremented by $O_{CPU}$, where $O_{CPU}$ is the load designation of the new CSI process. The load designation for a CSI process (e.g., $O_{CPU}$) may be rule-based (e.g., set by a wireless standard and/or hard-coded at the UE 120) and/or may be indicated by a network entity configuring the CSI report. For example, $O_{CPU}$ may be equal to 0 for a CSI report configuration (sometimes referred to as CSI-ReportConfig) associated with a higher layer report quantity parameter (sometimes referred to as reportQuantity) set to "none" and a CSI resource set (sometimes referred to as CSI-RS-ResourceSet) associated with a higher layer tracking reference signal (TRS) parameter (sometimes referred to as trs-Info) configured. $O_{CPU}$ may be equal to 1 for a CSI report configuration (e.g., CSI-ReportConfig) associated with a higher layer report quantity parameter (e.g., report Quantity) set to "cri-RSRP," "ssb-Index-RSRP," "cri-SINR," "ssb-Index-SINR," or "none," and a CSI resource set (e.g., CSI-RS-ResourceSet) with a higher layer TRS parameter (e.g., trs-Info) not configured. For a CSI report configuration (e.g., CSI-ReportConfig) associated with a higher layer report quantity parameter (e.g., reportQuantity) set to "cri-RI-PMI-CQI," "cri-RI-i1," "cri-RI-i1-CQI," "cri-RI-CQI," or "cri-RI-LI-PMI-CQI," $O_{CPU}$ may be equal to $N_{CPU}$ if the following criteria are met: a CSI report is aperiodically triggered without transmitting a PUSCH with either a transport block or a hybrid automatic repeat request (HARQ) ACK or both when L=0 CPUs are occupied, where the CSI corresponds to a single CSI with wideband frequency-granularity and to at most 4 CSI-RS ports in a single resource without CRI report, and where a codebook type parameter (sometimes referred to as code-bookType) is set to "typeI-SinglePanel" or where a higher layer report quantity parameter (e.g., reportQuantity) is set to "cri-RI-CQI." For a CSI report configuration (e.g., CSI-ReportConfig) associated with a higher layer report quantity parameter (e.g., reportQuantity) set to "cri-RI-PMI-CQI," "cri-RI-i1," "cri-RI-i1-CQI," "cri-RI-CQI," or "cri-RI-LI-PMI-CQI" but the additional criteria described above is not met, $O_{CPU}$ may be equal to $K_S$, where $K_S$ is the number of CSI-RS resources in the CSI-RS resource set for channel measurement.

Similarly, any time a CSI calculation ends, the count, L, is decremented by $O_{CPU}$ (e.g., the load designation of the completed process). At any given time, the $N_{CPU}$-L unoccupied CPUs may be used to add more CSI reports. Once there are no more unoccupied CPUs available, the UE 120 may not process more CSI, but instead may send an outdated CSI report for any CSI requests that are over the limit (e.g., for any CSI reporting settings received that would put L over the limit $N_{CPU}$, the UE 120 does not perform additional CSI measurements but instead transmits an outdated CSI report for the corresponding CSI reporting setting).

For example, the line shown by reference number 505 in FIG. 5 corresponds to the running count of occupied CPUs, L. In this example, the UE 120 may be capable of handling 6 simultaneous CPUs (e.g., $N_{CPU}$=6). The UE 120 in this example may receive one or more CSI report configurations (e.g., one or more CSI reporting settings) configuring the UE 120 to generate five CSI reports, indexed as CSI 1 through CSI 5. The first CSI report (CSI 1), the second CSI report (CSI 2), and the fifth CSI report (CSI 5) may be associated with a load designation of 1 CPU (e.g., $O_{CPU}$=1), the third CSI report (CSI 3) may be associated with a load designation of 2 CPUs (e.g., $O_{CPU}$=2), and the fourth CSI report (CSI 4) may be associated with a load designation of 4 CPUs. Accordingly, when the first CSI report is triggered, L is increased by 1, when the second CSI report is triggered, L is again increased by 1 (for a running count of 2 CPUs), and when the third CSI report is triggered, L is increased by 2 (for a running count of 4 CPUs). Thereafter, the first CSI report and the second CSI report may be completed and reported to the network before other CSI reports begin, and thus L may be decreased by 1 CPU for each completed report (for an updated running count of 2 CPUs). However, the fourth CSI report is associated with a load designation of 4, and thus when the fourth CSI report begins and L is increased by 4 (for a running count of 6 CPUs (e.g., the 2 CPUs used for the ongoing third CSI report and the 4 CPUs using for the fourth CSI report)), the UE 120 has reached the maximum number of simultaneous CPUs the UE 120 can handle (e.g., $N_{CPU}$). Thus, when the fifth CSI report is triggered, the UE 120 has no remaining unoccupied CPUs available, and thus the UE 120 may not perform additional CSI measurements corresponding to the fifth CSI report. Instead, for the fifth CSI report, the UE 120 may send an outdated CSI report to the network.

When a CPU becomes occupied for purposes of the running count of occupied CPUs (e.g., L) may depend on a nature of the CSI report (e.g., whether it is periodic, semi-persistent, or aperiodic), and, for periodic or semi-persistent CSI reports, the position of the specific report in a sequence of reports. More particularly, for periodic and semi-persistent CSI reports, for any report other than the first report in a sequence of CSI reports on a PUSCH, a CPU becomes occupied at the latest CSI measurement resource (e.g., a CSI-RS resource, a CSI interference measurement (CSI-IM) resource, or an SSB resource) that is usable for the report, and the CPU is released at the end of the last symbol of the PUCCH or PUSCH carrying the report. Moreover, the latest CSI measurement resource may correspond to the latest CSI measurement resource that is not later than a configured and/or predefined CSI reference resource. If multiple CSI reference resources are configured and/or predefined for a given report and the CSI reference resources do not occur at the same time, then the earliest of the CSI reference resources may be used to determine the latest CSI measurement resource.

For the first report in a sequence of CSI reports on a PUSCH, a CPU becomes occupied at the end of the last symbol of the PDCCH activating the CSI process, and the CPU is released at the end of the last symbol of the PUSCH carrying the first report. Similarly, for an aperiodic CSI report, the CPU becomes occupied at the end of the last symbol of the PDCCH activating the CSI process, and the CPU is released at the end of the last symbol of the PUSCH or PUCCH carrying the report.

Relatedly, in some aspects, a UE 120 may count a number of simultaneously active CSI-RS resources associated with a CSI report as another example of a CSI processing parameter. More particularly, the UE 120 may report to a network entity (such as a base station 110, a CU 310, a DU 330, an RU 340, or the like) the UE 120's capability on the number of simultaneously active CSI-RS resources that the UE 120 can handle. This may include reporting a maximum number of simultaneously active NZP CSI-RS resources per component carrier, reporting a maximum total number of ports in all simultaneously active NZP CSI-RS resources per component carrier, reporting a maximum number of simultaneously active NZP CSI-RS resources across all component carriers, and/or reporting a maximum total number of ports in all simultaneously active NZP CSI-RS resources across all component carriers.

When processing CSI related information, the UE 120 may keep a running count of simultaneously active CSI-RS resources associated with ongoing CSI reports. When a CSI-RS resource becomes active for purposes of the running count of simultaneously active CSI-RS resources may depend on a nature of the CSI-RS resource (e.g., whether it is periodic, semi-persistent, or aperiodic). For an aperiodic CSI-RS resource, the CSI-RS resource and the ports within the resource may become active at the end of the last symbol of the PDCCH carrying the associated CSI trigger, and the CSI-RS resource may become inactive at the end of the last symbol of the PUSCH carrying the associated CSI report. For a periodic CSI-RS resource, the CSI-RS resource and the ports within the resource may become active at the time of the configuration of the CSI-RS resource, and the CSI-RS resource may become inactive at the time of the release of the CSI-RS resource configuration. And for a semi-persistent CSI-RS resource, the CSI-RS resource and the ports within the resource may become active at the time of the activation of the CSI-RS resource, and the CSI-RS resource may become inactive at the time of the deactivation of the CSI-RS resource. Moreover, for any of the above, if a CSI-RS resource is referred N times by one or more CSI reporting settings (e.g., one or more CSI report configurations), the CSI-RS resource the ports with the resource may be counted N times.

As indicated above, FIG. 5 is provided as an example. Other examples may differ from what is described with regard to FIG. 5.

Figure 6:
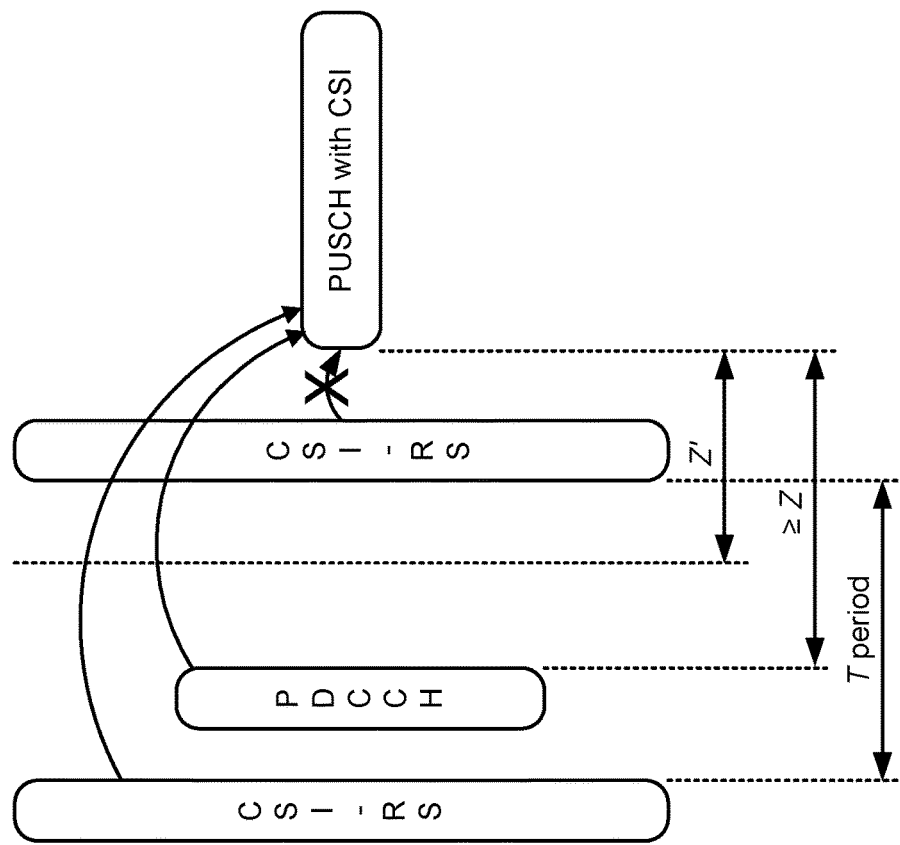
FIG. 6 is a diagram illustrating an example of computing CSI processing parameters, in accordance with the present disclosure.
Figure 6:
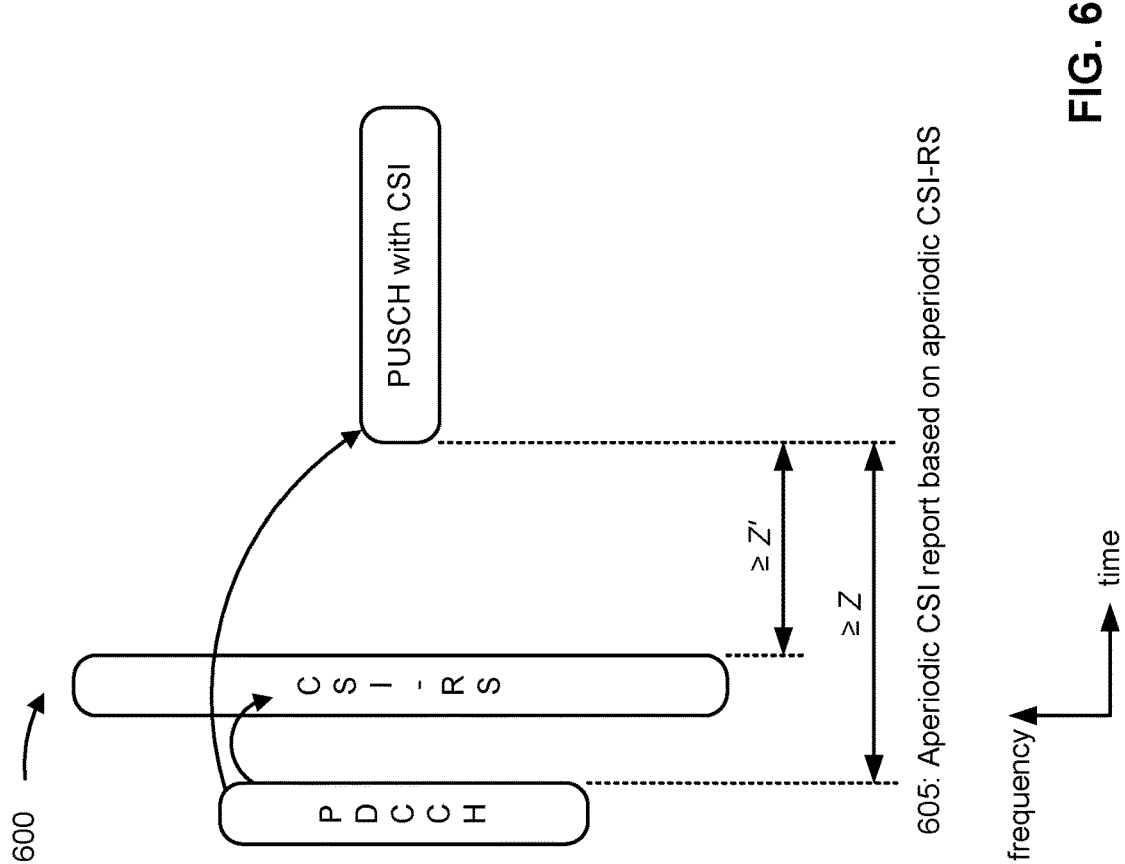

FIG. 6 is a diagram illustrating an example 600 of computing CSI processing parameters, in accordance with the present disclosure.

In addition to the CSI processing parameters described in connection with FIG. 5, in some aspects, a UE 120 may determine a CSI computation time associated with a CSI report. For example, in some aspects, a UE 120 may determine a processing time (sometimes referred to as Z) between a PDCCH including a configuration of a CSI report (e.g., a CSI reporting setting) and a PUSCH containing the CSI report. Additionally, or alternatively, UE 120 may determine a processing time (sometimes is referred to as Z') between a CSI-RS resource associated with a CSI report and the PUSCH containing the CSI report.

More particularly, FIG. 6 illustrates Z and Z' in the context of an aperiodic CSI report based on an aperiodic CSI-RS, as shown by reference number 605, and in the context of an aperiodic CSI report based on a periodic CSI-RS, as shown by reference number 610. First, for the aperiodic CSI report based on an aperiodic CSI-RS, a period of time between the PDCCH including the configuration of the CSI report and the PUSCH containing the CSI report must be greater than or equal to Z, and the period of time between the CSI-RS resource associated with the CSI report and the PUSCH containing the CSI report must be greater than or equal to Z'. Similarly, for the aperiodic CSI report based on a periodic CSI-RS (e.g., a CSI-RS occurring with a periodicity of T), a period of time between the PDCCH including the configuration of the CSI report and the PUSCH containing the CSI report must be greater than or equal to Z, and the PUSCH can include CSI reports corresponding to CSI-RS resources that occurred greater than or equal to Z' prior to the PUSCH. Thus, in the depicted example, the PUSCH may include the CSI report corresponding to a first CSI-RS resource (e.g., the leftmost CSI-RS resource) because that resource occurred more than Z' prior to the PUSCH, but the PUSCH may not include the CSI report corresponding to a second CSI-RS resource (e.g., the rightmost CSI-RS resource) because that resource occurred less than Z' prior to the PUSCH.

The particular values of Z and Z' for a given CSI report may depend on whether the CSI report is associated with a fast CSI report time, a low-complexity CSI report time, or a high-complexity CSI report time. For example, a fast CSI report time may be associated with a configured CSI report that occurs when there are no other concurrent CSI reports (e.g., when L, described in connection with FIG. 5, is equal to 0); when the UE 120 will transmit only the CSI report in a given PUSCH, without other uplink data and without a HARQ ACK feedback; when the configured CSI report is associated with a single CSI-RS resource, with up to four ports and without a CRI; when the configured CSI report is a wideband only report; and when either the configured CSI report is associated with a type I, single-panel codebook, or the configured CSI report is associated with no PMI report (e.g., the parameter reportQuantity may be equal to "cri-RI- CQI," and CRI may not be reported because the configured CSI report is associated with a single CSI-RS resource). In such aspects, for subcarrier spacings of 15 kHz, 30 kHz, 60 kHz, and 120 kHz, Z may be 10 symbols (713.5 microseconds (μs)), 13 symbols (463.8 μs), 25 symbols (446 μs), and 43 symbols (383.5 μs), respectively, and Z' may be equal to 8 symbols (570.8 μs), 11 symbols (392.4 μs), 21 symbols (374.6 μs), and 36 symbols (321.1 μs), respectively.

A CSI report associated with a low-complexity CSI report time may include many of the attributes of a CSI report associated with a fast CSI report time, except that there may be concurrent CSI calculations and/or multiplexing with data or HARQ ACK in the PUSCH used to transmit the CSI report. That is, a low-complexity CSI report time may be associated with a configured CSI report that occurs when there may be other concurrent CSI reports (e.g., when L, described in connection with FIG. 5, is greater than or equal to 0); when the UE 120 may transmit more than the CSI report in a given PUSCH, such as uplink data and/or a HARQ ACK feedback in addition to the CSI report; when the configured CSI report is associated with a single CSI-RS resource, with up to four ports and without a CRI; when the configured CSI report is a wideband only report; and when either the configured CSI report is associated with a type I, single-panel codebook, or the configured CSI report is associated with no PMI report (e.g., the parameter reportQuantity may be equal to "cri-RI-CQI," and CRI may not be reported because the configured CSI report is associated with a single CSI-RS resource). In such aspects, for subcarrier spacings of 15 kHz, 30 kHz, 60 kHz, and 120 kHz, Z may be 22 symbols (1569.8 μs), 33 symbols (1177.3 μs), 44 symbols (784.9 μs), and 97 symbols (865.2 μs), respectively, and Z' may be equal to 16 symbols (1141.7 μs), 30 symbols (1070.3 μs), 42 symbols (749.2 μs), and 85 symbols (758.1 μs), respectively.

A CSI report may be associated with a high-complexity CSI report time if it does qualify as a fast CSI report or low-complexity CSI report, using the criteria described above, and is not a CSI report associated with a beam management procedure. In such aspects, for subcarrier spacings of 15 kHz, 30 kHz, 60 kHz, and 120 kHz, Z may be 40 symbols (2854.2 μs), 72 symbols (2568.8 μs), 141 symbols (2515.2 μs), and 152 symbols (1355.7 μs), respectively, and Z' may be equal to 37 symbols (2640.1 μs), 69 symbols (2461.7 μs), 140 symbols (2497.4 μs), and 140 symbols (1248.7 μs), respectively.

While the above-described CSI processing parameters (e.g., the number of CPUs associated with a CSI report, a number of simultaneously active CSI-RS resources associated with a CSI report, and a CSI computation time associated with a CSI report) may correspond to a CSI processing load at the UE 120 when a single antenna port configuration is implemented (e.g., when a single codebook is utilized for a configured CSI report), the CSI processing parameters may not accurately correspond to the CSI processing load at the UE 120 when the CSI report is configured with multiple codebooks and/or antenna port configurations. More particularly, a network entity (such as a base station 110, an RU 340, or the like) may be associated with a massive-MIMO active antenna unit (AAU) that includes multiple, co-located panels consisting of multiple antenna ports. Each panel may be equipped with numerous power amplifiers and antenna subsystems, which consume large amounts of power. For example, more than 20% of all expenses associated with a wireless network may be attributed to energy costs necessary to operate the wireless network, and, of those energy costs, over 50% may be attributed to radio access network (RAN) energy costs. Thus, in an effort to reduce energy consumption or the like, a wireless network may dynamically turn off one or more panels, subpanels, or antenna ports associated with a network entity when the cell load is low.

In such aspects, a configuration of a CSI report (e.g., a CSI reporting setting), may indicate multiple codebooks, each associated with an antenna port configuration. For example, the configuration of the CSI report may indicate a first codebook associated with a base antenna port configuration including 32 antenna ports (e.g., $(N_1, N_2)=(4, 4)$, composed of four panels consisting of $(N_1, N_2)=(2, 2)$ cross-polarized antennas each), which may correspond to an antenna port configuration when no panels or subpanels are turned off. However, the configuration of the CSI report may include additional codebooks associated with reduced antenna port configurations, which may correspond to antenna port configurations when at least one panel or subpanel is turned off. For example, the configuration of the CSI report may indicate a second codebook associated with an antenna port configuration including 4 antenna ports (e.g., $(N_1, N_2)=(2, 1)$), a third and fourth codebook associated with an antenna port configuration including 8 antenna ports (e.g., $(N_1, N_2)=(2, 2)$ and $(N_1, N_2)=(4, 1)$), a fifth codebook associated with an antenna port configuration including 16 antenna ports (e.g., $(N_1, N_2)=(4, 2)$), and so forth.

In such aspects, the UE may need to derive CSI for each codebook and report the CSI for each codebook to the network entity. In some aspects, the UE 120 may do so by providing a supplemental CSI (S-CSI) associated with each of the reduced antenna port configurations (e.g., associated with each of the second through fifth codebooks, described above). In some aspects, the S-CSI may be derived from CSI-RS resources configured for the base antenna port configuration. For example, if 32 CSI-RS resources, comprised of 4 code division multiplexed (CDM) groups, is configured for the base antenna port configuration, the UE 120 may derive an S-CSI associated with each of the reduced antenna port configurations (e.g., associated with each of the codebooks) by using one or more CDM group, of the four CDM groups, to derive each of the S-CSI. In some aspects, the UE 120 may be configured or hard coded with restriction rules indicating which CSI-RS resources (e.g., which CDM groups) should be used to derive each S-CSI. In some aspects, a same CSI report configuration (e.g., CSI reporting setting) may be used to configure each of the CSI reports (e.g., the CSI report and the additional S-CSI reports), while, in some other aspects, multiple CSI report configurations may be used to configure each of the CSI reports (e.g., a first CSI report configuration may configure a report associated with the base antenna configuration, while a second CSI report may configure a report associated with the reduced antenna port configurations (e.g., codebooks two through five in the above example).

Notably, although the UE 120 may be configured with multiple codebook configurations associated with reduced antenna port configurations, and thus may need to derive multiple CSI reports, the legacy CSI processing parameters, such as those described above in connection with FIGS. 5 and 6 (e.g., the number of CPUs associated with a CSI report, a number of simultaneously active CSI-RS resources associated with a CSI report, and a CSI computation time associated with a CSI report) assume a single codebook configuration per CSI reporting setting. Accordingly, such CSI processing parameters may not accurately reflect a processing load at the UE 120, which may be generating many more reports and consuming much more resources than assumed under the legacy CSI processing parameters. This may result in an under-accounted-for CSI processing load, leading to incomplete CSI measurements and reporting and thus inaccurate or outdated CSI information being reported to the network entity. Accordingly, the network entity may not be able to accurately estimate channels associated with the multiple codebooks, resulting in poor link quality and thus increased latency, reduced throughput, and even link failure.

Some techniques and apparatuses described herein enable accurate CSI processing parameter computations that account for multiple codebook configurations in a given CSI report configuration (e.g., in a given CSI reporting setting). In some aspects, a UE (e.g., UE 120) may receive a configuration of a CSI report that includes multiple codebooks, each associated with a corresponding antenna port configuration, and the UE may compute at least one CSI processing parameter based at least in part on the configuration of the CSI report (and thus the multiple codebooks included therein). For example, the UE may compute one or more of a number of CPUs associated with a CSI report, a CSI computation time associated with a CSI report, and a number of simultaneously active CSI-RS resources associated with a CSI report, while considering the multiple codebook configurations. This may include computing the number of CPUs based at least in part on a quantity of configured CSI-RS resources and a quantity of the multiple codebooks, computing the CSI computation time associated with the CSI report based at least in part on a pre-configured high-complexity CSI report time and a computation time scaling factor, or computing the number of simultaneously active CSI-RS resources based at least in part on a quantity of the multiple codebooks. By accounting for the multiple codebooks when computing the various CSI processing parameters described herein, a UE may more accurately account for a CSI processing load, leading to robust CSI measurements and reports, and thus improved channel quality, decreased latency, increased throughput, and overall more efficient resource utilization.

As indicated above, FIG. 6 is provided as an example. Other examples may differ from what is described with regard to FIG. 6.

Figure 7:
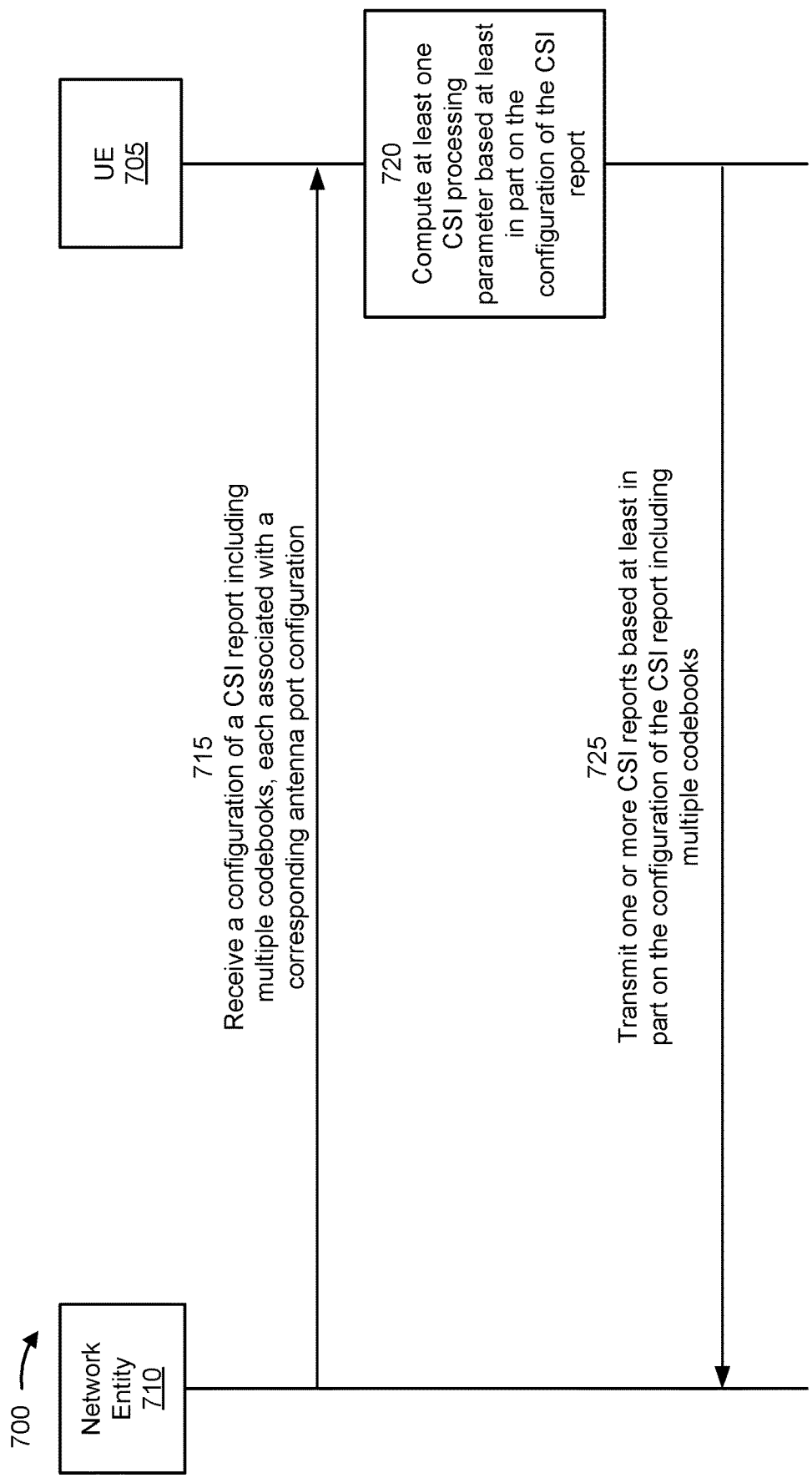
FIG. 7 is a diagram of an example associated with computing CSI processing parameters for multiple configured codebooks, in accordance with the present disclosure.

FIG. 7 is a diagram of an example 700 associated with computing CSI processing parameters for multiple configured codebooks, in accordance with the present disclosure. As shown in FIG. 7, a UE 705 (e.g., UE 120) and a network entity 710 (e.g., base station 110, a CU 310, a DU 330, and/or an RU 340) may communicate with each other. In some aspects, the UE 705 and the network entity 710 may be part of a wireless network (e.g., wireless network 100). The UE 705 and the network entity 710 may have established a wireless connection prior to operations shown in FIG. 7.

As shown by reference number 715, the UE 705 may receive, from the network entity 710, configuration information. In some aspects, the UE 705 may receive the configuration information via one or more of RRC signaling, one or more MAC control elements (MAC-CEs), and/or DCI, among other examples. In some aspects, the configuration information may include an indication of one or more configuration parameters (e.g., already known to the UE 705 and/or previously indicated by the network entity 710 or another network device) for selection by the UE 705, and/or explicit configuration information for the UE 705 to use to configure the UE 705, among other examples.

In some aspects, the configuration information shown by reference number 715 may include a configuration of a CSI report (e.g., a CSI reporting setting) including multiple codebooks. In some aspects, each codebook, of the multiple codebooks, may be associated with a corresponding antenna port configuration. For example, as described above in connection with FIG. 6, the configuration may include a configuration of a codebook associated with a base antenna port configuration (e.g., a configuration utilizing all available panels and ports), and a configuration of at least one codebook associated with a reduced antenna port configuration (e.g., a configuration utilizing less than all available panels or ports). For example, returning to aspects involving 32 antenna ports, the configuration may configure a first codebook associated with a base antenna port configuration implementing all 32 antenna ports (e.g., $(N_1, N_2)=(4, 4)$, composed of four panels consisting of $(N_1, N_2)=(2, 2)$ cross-polarized antennas each), a second codebook associated with an antenna port configuration including 4 antenna ports (e.g., $(N_1, N_2)=(2, 1)$), a third and a fourth codebook, each associated with an antenna port configuration including 8 antenna ports (e.g., $(N_1, N_2)=(2, 2)$ and $(N_1, N_2)=(4, 1)$), and a fifth codebook associated with an antenna port configuration including 16 antenna ports (e.g., $(N_1, N_2)=(4, 2)$). The configuration of each codebook may include additional configuration information, such as a configuration of a corresponding beam associated with the codebook, an RI restriction associated with the codebook, or the like.

As shown by reference number 720, the UE 705 may compute at least one CSI processing parameter based at least in part on the configuration of the CSI report. More particularly, the UE 120 may compute one or more of the CSI processing parameters described above in connection with FIGS. 5 and 6, including a number of CPUs associated with the CSI report, a CSI computation time associated with the CSI report, and/or a number of simultaneously active CSI-RS resources associated with the CSI report.

In aspects in which the at least one CSI processing parameter includes a number of CPUs associated with the CSI report, the number of CPUs may be based at least in part on a quantity of CSI-RS resources and a quantity of the multiple codebooks (e.g., the number of reduced antenna port configurations). More particularly, the number of CPUs associated with the CSI report may be based at least in part on a product of the quantity of the configured CSI-RS resources and the quantity of the multiple codebooks. Moreover, in some aspects, the number of CPUs associated with the CSI report may be based at least in part on a CPU scaling factor associated with a quantity of the multiple codebooks, sometimes referred to as μ. For example, if the configuration of the CSI report (e.g., a CSI reporting setting) includes M codebook configurations (e.g., M antenna port configurations) with K CSI-RS resources for performing CSI measurements (which, as described, may be a subset of the CSI-RS resources associated with the base antenna configuration), the number of CPUs associated with the M codebook configurations may be equal to K $\Sigma_{i=1}^{T} \mu_i M_i$, where $\mu_i \leq 1$ and is a fixed CPU scaling factor for a group of $M_i$ reduced antenna configurations, and where $\Sigma_{i=T} M_i = M$.

Moreover, in aspects in which the at least one CSI processing parameter includes a CSI computation time associated with the CSI report, the CSI computation time may be based at least in part on the CPU scaling factor (e.g., μ). More particularly, in aspects in which the CPU scaling factor is equal to 1, the CSI computation time may be computed according to the legacy procedures described in connection with FIG. 5 (e.g., by selecting a value of Z and/or Z' according to a pre-configured fast CSI report time, a pre-configured low-complexity CSI report time, or a pre-configured high-complexity CSI report time). This is because using a CPU scaling factor equal to 1 may result in the legacy CSI computation processing times providing sufficient time for the UE 705 to perform the necessary CSI computations.

However, in aspects in which the CPU scaling factor is less than 1, the CSI computation time defined by the legacy procedures (e.g., the values of Z and/or Z' according to the pre-configured fast CSI report time, the pre-configured low-complexity CSI report time, and/or the pre-configured high-complexity CSI report time) may be scaled up in order to compensate for the extra computations needed for the multiple antenna port configurations. More particularly, in some aspects, when the CPU scaling factor is less than one, the CSI computation time associated with the CSI report may be at least a product of a pre-configured high-complexity CSI report time (e.g., Z and Z' associated with the pre-configured high-complexity CSI report time) and a computation time scaling factor, sometimes referred to as β. In some aspects, the computation time scaling factor (e.g., β) may be greater than or equal to one. Put another way, for an aperiodic CSI report, when the UE 705 is configured with a CSI reporting setting having M>1 antenna port configurations and K CSI-RS resources, if the number of CPUs for the CSI report setting is less than M*K (which means that the CPU scaling factor (e.g., μ) described above is less than 1), the total CSI computation time (Z, Z') for the CPUs may be at least $\beta*(Z_h, Z_h')$, where $(Z_h, Z_h')$ is the CSI computation time associated with a pre-configured high-complexity CSI report time. As described above in connection with FIG. 5, for subcarrier spacings of 15 kHz, 30 kHz, 60 kHz, and 120 kHz, $Z_h$ may be 40 symbols (2854.2 μs), 72 symbols (2568.8 μs), 141 symbols (2515.2 μs), and 152 symbols (1355.7 μs), respectively, and $Z_h'$ may be equal to 37 symbols (2640.1 μs), 69 symbols (2461.7 μs), 140 symbols (2497.4 μs), and 140 symbols (1248.7 μs), respectively. Thus, in such aspects, the CSI computation time may be equal to at least one of these values multiplied by β.

In some aspects, the computation time scaling factor may be a fixed and/or pre-configured value. For example, the UE 705 may be hard-coded with the value of β and/or the value of β may be signaled to the UE 705 by the network entity 710. In some other aspects, the computation time scaling factor may be based at least in part on at least one of the quantity of configured CSI-RS resources (e.g., K), the quantity of the multiple codebooks (e.g., M), the number of CPUs associated with the CSI report, and/or the CPU scaling factor. For example, in some aspects, β may be equal to $$\frac{1}{\min_{i=1,\ldots,T} \mu_i}.$$

In some aspects, the at least one CSI processing parameter may include a number of simultaneously active CSI-RS resources associated with the CSI report, and/or a number of ports associated with the number of simultaneously active CSI-RS resources associated with the CSI report. In such aspects, the number of simultaneously active CSI-RS resources associated with the CSI report and/or the number of ports may be based at least in part on a quantity of the multiple codebooks. Put another way, in aspects in which a CSI-RS resource is referred by a CSI reporting setting with multiple antenna port configurations (e.g., multiple codebooks), counting the CSI-RS resource and the CSI-RS ports within the CSI-RS resource for the CSI reporting setting may depend on the number of antenna port configurations (e.g., codebooks) associated with the CSI-RS resource. In some aspects, the number of simultaneously active CSI-RS resources associated with the CSI report and the number of ports are based at least in part on a resource counting scaling factor (sometimes referred to as α) associated with a quantity of the multiple codebooks (e.g., M), with the resource counting scaling factor being less than or equal to one. More particularly, in some aspects, the CSI-RS resource and the CSI-RS ports within the CSI-RS resource associated with a CSI report setting with M antenna port configurations are counted as $C_n$, where $C_n$ may be equal to $\Sigma_{i=1}^{T} \alpha_i M_i$, where $\alpha_i$ is the resource counting scaling factor (which may be less than or equal to one, as described) for a group of $M_i$ reduced antenna port configurations, and where $\Sigma_{i=1}^{T} M_i = M$. Thus, if a CSI-RS resource is referred N times by one or more CSI reporting settings, the CSI-RS resource and the CSI-RS ports within the CSI-RS resource may be counted $\Sigma_{n=0}^{N-1} C_n$ times for purposes of computing a number of simultaneously active CSI-RS resources associated with the CSI report.

As shown by reference number 725, in some aspects, the UE 705 may transmit, to the network entity 710, one or more CSI reports based at least in part on the configuration of the CSI report including multiple codebooks. For example, in some aspects, the UE 705 may transmit, to the network entity 710, a CSI report that includes CSI information for multiple antenna port configurations, each corresponding to one of the multiple codebooks. Because the UE 705 may have computed one or more CSI processing parameters based at least in part on the configuration of the CSI report including multiple codebooks, the CSI report may include more accurate and/or complete CSI information as compared to reports transmitted according to legacy procedures, thereby resulting in improved channel quality, as described.

As indicated above, FIG. 7 is provided as an example. Other examples may differ from what is described with respect to FIG. 7.

Figure 8:
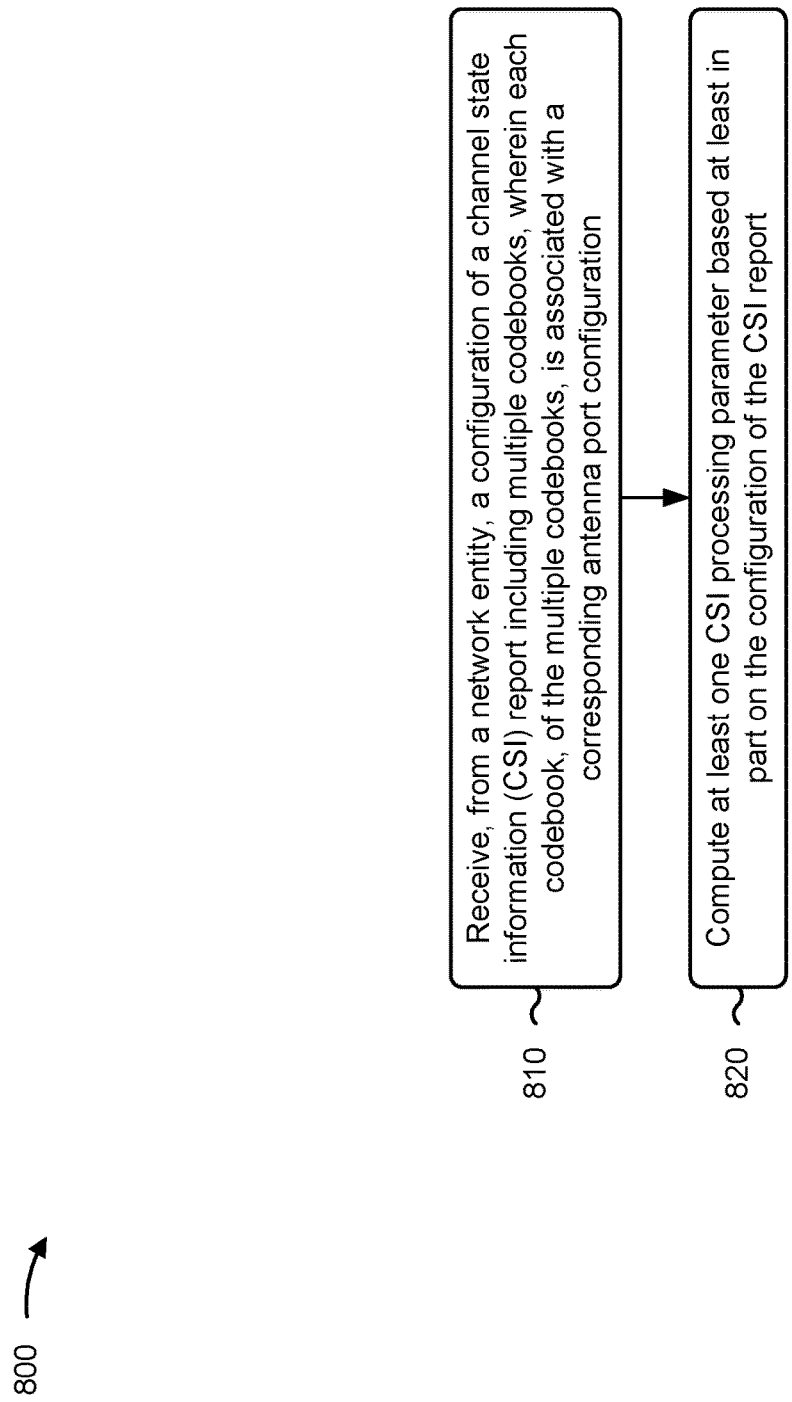
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 705) performs operations associated with CSI processing parameters for multiple configured codebooks.

As shown in FIG. 8, in some aspects, process 800 may include receiving, from a network entity (e.g., network entity 710), a configuration of a CSI report including multiple codebooks, wherein each codebook, of the multiple codebooks, is associated with a corresponding antenna port configuration (block 810). For example, the UE (e.g., using communication manager 908 and/or reception component 902, depicted in FIG. 9) may receive, from a network entity, a configuration of a CSI report including multiple codebooks, wherein each codebook, of the multiple codebooks, is associated with a corresponding antenna port configuration, as described above.

As further shown in FIG. 8, in some aspects, process 800 may include computing at least one CSI processing parameter based at least in part on the configuration of the CSI report (block 820). For example, the UE (e.g., using communication manager 140 and/or CSI processing component 910, depicted in FIG. 9) may compute at least one CSI processing parameter based at least in part on the configuration of the CSI report, as described above.

Process 800 may include additional aspects, such as any single aspect or any combination of aspects described below and/or in connection with one or more other processes described elsewhere herein.

In a first aspect, the at least one CSI processing parameter includes a number of CPUs associated with the CSI report.

In a second aspect, alone or in combination with the first aspect, the number of CPUs associated with the CSI report is based at least in part on a quantity of configured CSI-RS resources and a quantity of the multiple codebooks.

In a third aspect, alone or in combination with one or more of the first and second aspects, the number of CPUs associated with the CSI report is based at least in part on a product of the quantity of the configured CSI-RS resources and the quantity of the multiple codebooks.

In a fourth aspect, alone or in combination with one or more of the first through third aspects, the number of CPUs associated with the CSI report is based at least in part on a CPU scaling factor associated with a quantity of the multiple codebooks.

In a fifth aspect, alone or in combination with one or more of the first through fourth aspects, the CPU scaling factor is less than or equal to one.

In a sixth aspect, alone or in combination with one or more of the first through fifth aspects, process 800 includes determining a CSI computation time associated with the CSI report based at least in part on the configuration of the CSI report.

In a seventh aspect, alone or in combination with one or more of the first through sixth aspects, the CPU scaling factor is equal to one, and the CSI computation time associated with the CSI report is one of a pre-configured fast CSI report time, a pre-configured low-complexity CSI report time, or a pre-configured high-complexity CSI report time.

In an eighth aspect, alone or in combination with one or more of the first through seventh aspects, the CPU scaling factor is less than one, and the CSI computation time associated with the CSI report is at least a product of a pre-configured high-complexity CSI report time and a computation time scaling factor.

In a ninth aspect, alone or in combination with one or more of the first through eighth aspects, the computation time scaling factor is greater than or equal to one.

In a tenth aspect, alone or in combination with one or more of the first through ninth aspects, the computation time scaling factor is based at least in part on at least one of a quantity of configured CSI-RS resources, the quantity of the multiple codebooks, the number of CPUs associated with the CSI report, or the CPU scaling factor.

In an eleventh aspect, alone or in combination with one or more of the first through tenth aspects, the computation time scaling factor is a pre-configured value.

In a twelfth aspect, alone or in combination with one or more of the first through eleventh aspects, the at least one CSI processing parameter includes a number of simultaneously active CSI-RS resources associated with the CSI report.

In a thirteenth aspect, alone or in combination with one or more of the first through twelfth aspects, the at least one CSI processing parameter further includes a number of ports associated with the number of simultaneously active CSI-RS resources associated with the CSI report.

In a fourteenth aspect, alone or in combination with one or more of the first through thirteenth aspects, the number of simultaneously active CSI-RS resources associated with the CSI report and the number of ports are based at least in part on a quantity of the multiple codebooks.

In a fifteenth aspect, alone or in combination with one or more of the first through fourteenth aspects, the number of simultaneously active CSI-RS resources associated with the CSI report and the number of ports are based at least in part on a resource counting scaling factor associated with a quantity of the multiple codebooks.

In a sixteenth aspect, alone or in combination with one or more of the first through fifteenth aspects, the resource counting scaling factor is less than or equal to one.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
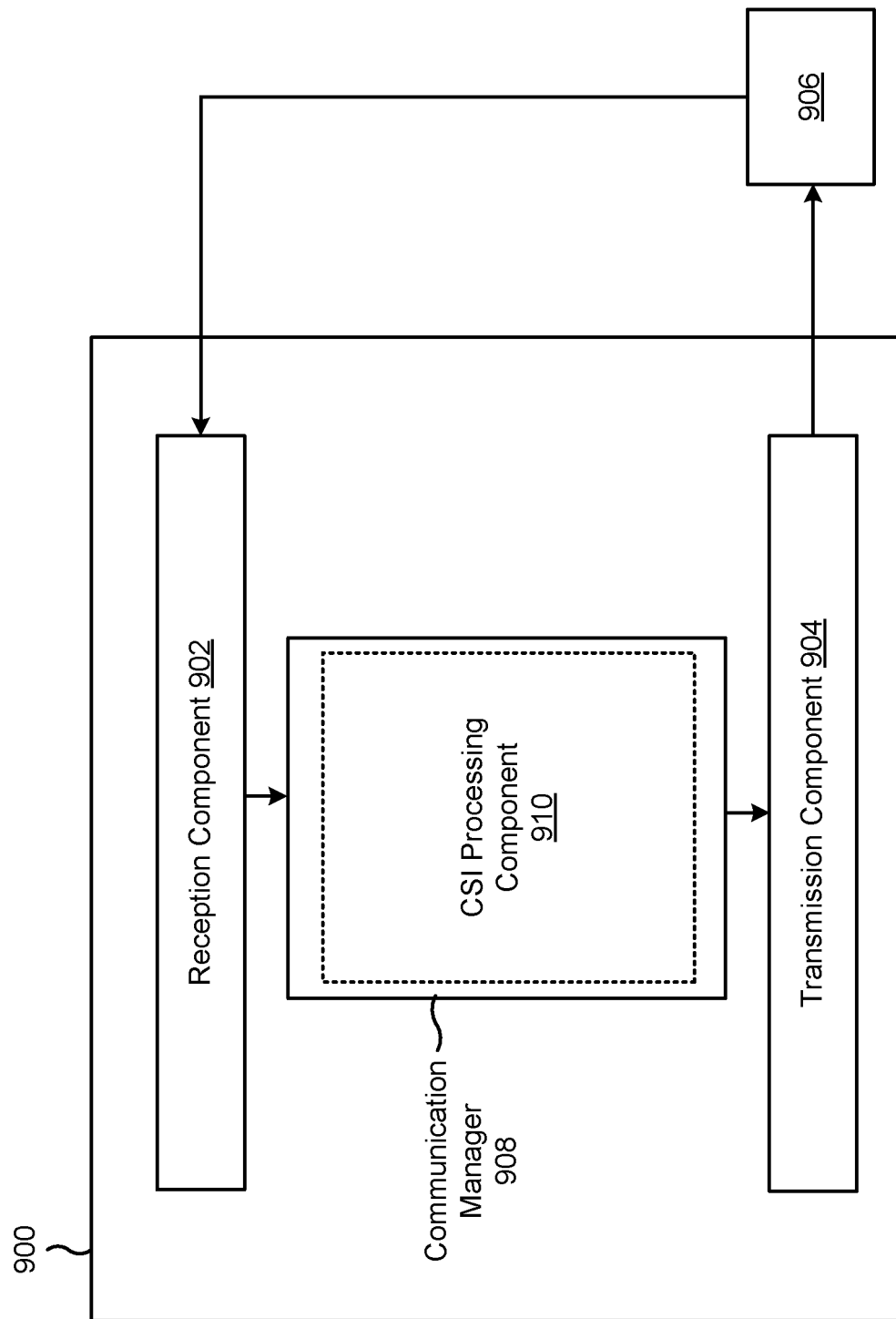
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE (e.g., UE 705), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908 (e.g., communication manager 140). The communication manager 140 may include a CSI processing component 910, among other examples.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE 120 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE 120 described in connection with FIG. 2. In some aspects, the transmission component 904 may be co-located with the reception component 902 in a transceiver.

The reception component 902 may receive, from a network entity, a configuration of a CSI report including multiple codebooks, wherein each codebook, of the multiple codebooks, is associated with a corresponding antenna port configuration. The CSI processing component 910 may compute at least one CSI processing parameter based at least in part on the configuration of the CSI report. The CSI processing component 910 may also determine a CSI computation time associated with the CSI report based at least in part on the configuration of the CSI report.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a network entity, a configuration of a CSI report including multiple codebooks, wherein each codebook, of the multiple codebooks, is associated with a corresponding antenna port configuration; and computing at least one CSI processing parameter based at least in part on the configuration of the CSI report.

Aspect 2: The method of Aspect 1, wherein the at least one CSI processing parameter includes a number of CPUs associated with the CSI report.

Aspect 3: The method of Aspect 2, wherein the number of CPUs associated with the CSI report is based at least in part on a quantity of configured CSI-RS resources and a quantity of the multiple codebooks.

Aspect 4: The method of Aspect 3, wherein the number of CPUs associated with the CSI report is based at least in part on a product of the quantity of the configured CSI-RS resources and the quantity of the multiple codebooks.

Aspect 5: The method of any of Aspects 2-4, wherein the number of CPUs associated with the CSI report is based at least in part on a CPU scaling factor associated with a quantity of the multiple codebooks.

Aspect 6: The method of Aspect 5, wherein the CPU scaling factor is less than or equal to one.

Aspect 7: The method of Aspect 6, further comprising determining a CSI computation time associated with the CSI report based at least in part on the configuration of the CSI report.

Aspect 8: The method of Aspect 7, wherein the CPU scaling factor is equal to one, and wherein the CSI computation time associated with the CSI report is one of a pre-configured fast CSI report time, a pre-configured low-complexity CSI report time, or a pre-configured high-complexity CSI report time.

Aspect 9: The method of Aspect 7, wherein the CPU scaling factor is less than one, and wherein the CSI computation time associated with the CSI report is at least a product of a pre-configured high-complexity CSI report time and a computation time scaling factor.

Aspect 10: The method of Aspect 9, wherein the computation time scaling factor is greater than or equal to one.

Aspect 11: The method of any of Aspects 9-10, wherein the computation time scaling factor is based at least in part on at least one of a quantity of configured CSI-RS resources, the quantity of the multiple codebooks, the number of CPUs associated with the CSI report, or the CPU scaling factor.

Aspect 12: The method of any of Aspects 9-10, wherein the computation time scaling factor is a pre-configured value.

Aspect 13: The method of any of Aspects 1-12, wherein the at least one CSI processing parameter includes a number of simultaneously active CSI-RS resources associated with the CSI report.

Aspect 14: The method of Aspect 13, wherein the at least one CSI processing parameter further includes a number of ports associated with the number of simultaneously active CSI-RS resources associated with the CSI report.

Aspect 15: The method of Aspect 14, wherein the number of simultaneously active CSI-RS resources associated with the CSI report and the number of ports are based at least in part on a quantity of the multiple codebooks.

Aspect 16: The method of any of Aspects 14-15, wherein the number of simultaneously active CSI-RS resources associated with the CSI report and the number of ports are based at least in part on a resource counting scaling factor associated with a quantity of the multiple codebooks.

Aspect 17: The method of Aspect 16, wherein the resource counting scaling factor is less than or equal to one.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors coupled to the one or more memories, the one or more memories storing instructions configurable to be executed by the one or more processors to cause the UE to:
      receive, from a network entity, a configuration of a channel state information (CSI) report including multiple codebooks, wherein each codebook, of the multiple codebooks, is associated with a corresponding antenna port configuration; and
      compute a number of simultaneously occupied CSI processing units (CPUs) associated with the CSI report based at least in part on the configuration of the CSI report, wherein the number of simultaneously occupied CPUs is based at least in part on a quantity of configured CSI reference signal (CSI-RS) resources.

2. The apparatus of claim 1, wherein the number of simultaneously occupied CPUs is based at least in part on the quantity of configured CSI-RS resources and a quantity of the multiple codebooks.

3. The apparatus of claim 2, wherein the number of simultaneously occupied CPUs is based at least in part on a product of the quantity of the configured CSI-RS resources and the quantity of the multiple codebooks.

4. The apparatus of claim 1, wherein the number of simultaneously occupied CPUs is based at least in part on a CPU scaling factor associated with a quantity of the multiple codebooks.

5. The apparatus of claim 4, wherein the CPU scaling factor is less than or equal to one.

6. The apparatus of claim 5, wherein the instructions configurable to be executed are further executable by the one or more processors to cause the UE to determine a CSI computation time associated with the CSI report based at least in part on the configuration of the CSI report.

7. The apparatus of claim 6, wherein the CPU scaling factor is equal to one, and wherein the CSI computation time associated with the CSI report is one of a pre-configured fast CSI report time, a pre-configured low-complexity CSI report time, or a pre-configured high-complexity CSI report time.

8. The apparatus of claim 6, wherein the CPU scaling factor is less than one, and wherein the CSI computation time associated with the CSI report is at least a product of a pre-configured high-complexity CSI report time and a computation time scaling factor.

9. The apparatus of claim 8, wherein the computation time scaling factor is greater than or equal to one.

10. The apparatus of claim 8, wherein the computation time scaling factor is based at least in part on at least one of the quantity of configured CSI-RS resources, the quantity of the multiple codebooks, the number of simultaneously occupied CPUs, or the CPU scaling factor.

11. The apparatus of claim 8, wherein the computation time scaling factor is a pre-configured value.

12. The apparatus of claim 1, wherein the instructions configurable to be executed are further executable by the one or more processors to cause the UE to compute a number of simultaneously active CSI-RS resources associated with the CSI report.

13. The apparatus of claim 12, wherein the instructions configurable to be executed are further executable by the one or more processors to cause the UE to compute a number of ports associated with the number of simultaneously active CSI-RS resources associated with the CSI report.

14. The apparatus of claim 13, wherein the number of simultaneously active CSI-RS resources associated with the CSI report and the number of ports are based at least in part on a quantity of the multiple codebooks.

15. The apparatus of claim 13, wherein the number of simultaneously active CSI-RS resources associated with the CSI report and the number of ports are based at least in part on a resource counting scaling factor associated with a quantity of the multiple codebooks.

16. The apparatus of claim 15, wherein the resource counting scaling factor is less than or equal to one.

17. A method of wireless communication performed by a user equipment (UE), comprising:
receiving, from a network entity, a configuration of a channel state information (CSI) report including multiple codebooks, wherein each codebook, of the multiple codebooks, is associated with a corresponding antenna port configuration; and
computing a number of simultaneously occupied CSI processing units (CPUs) associated with the CSI report based at least in part on the configuration of the CSI report, wherein the number of simultaneously occupied CPUs is based at least in part on a quantity of configured CSI reference signal (CSI-RS) resources.

18. The method of claim 17, wherein the number of simultaneously occupied CPUs is based at least in part on a product of the quantity of configured CSI-RS resources and a quantity of the multiple codebooks.

19. The method of claim 17, wherein the number of simultaneously occupied CPUs is based at least in part on a CPU scaling factor associated with a quantity of the multiple codebooks.

20. The method of claim 19, further comprising determining a CSI computation time associated with the CSI report based at least in part on the configuration of the CSI report.

21. The method of claim 20, wherein the CPU scaling factor is less than one, and wherein the CSI computation time associated with the CSI report is at least a product of a pre-configured high-complexity CSI report time and a computation time scaling factor.

22. The method of claim 17, further comprising:
computing a number of simultaneously active CSI-RS resources associated with the CSI report.

23. The method of claim 22, further comprising:
computing a number of ports associated with the number of simultaneously active CSI-RS resources associated with the CSI report, and wherein the number of simultaneously active CSI-RS resources associated with the CSI report and the number of ports are based at least in part on a quantity of the multiple codebooks.

24. The method of claim 23, wherein the number of simultaneously active CSI-RS resources associated with the CSI report and the number of ports are based at least in part on a resource counting scaling factor associated with the quantity of the multiple codebooks.

25. A non-transitory computer-readable medium storing one or more instructions for wireless communication, the one or more instructions, when executed by one or more processors of a user equipment (UE), cause the UE to:
receive, from a network entity, a configuration of a channel state information (CSI) report including multiple codebooks, wherein each codebook, of the multiple codebooks, is associated with a corresponding antenna port configuration; and
compute a number of simultaneously occupied CSI processing units (CPUs) associated with the CSI report based at least in part on the configuration of the CSI report, wherein the number of simultaneously occupied CPUs is based at least in part on a quantity of configured CSI reference signal (CSI-RS) resources.

26. The non-transitory computer-readable medium of claim 25, wherein the one or more instructions, when executed by the one or more processors of the UE, cause the UE to:
compute a CSI computation time associated with the CSI report; or
compute a number of ports associated with the number of simultaneously active CSI-RS resources associated with the CSI report.

27. An apparatus for wireless communication, comprising:
means for receiving, from a network entity, a configuration of a channel state information (CSI) report including multiple codebooks, wherein each codebook, of the multiple codebooks, is associated with a corresponding antenna port configuration; and
means for computing a number of simultaneously occupied CSI processing units (CPUs) associated with the CSI report based at least in part on the configuration of the CSI report, wherein the number of simultaneously occupied CPUs is based at least in part on a quantity of configured CSI reference signal (CSI-RS) resources.

28. The apparatus of claim 27, wherein the number of simultaneously occupied CPUs is based at least in part on a product of the quantity of configured CSI-RS resources and a quantity of the multiple codebooks.

29. The apparatus of claim 28, further comprising:
means for computing a CSI computation time associated with the CSI report; or
means for computing a number of ports associated with the number of simultaneously active CSI-RS resources associated with the CSI report.

30. The non-transitory computer-readable medium of claim 25, wherein the number of simultaneously occupied CPUs is based at least in part on a product of the quantity of configured CSI-RS resources and a quantity of the multiple codebooks.

* * * * *